United States Patent [19]

Ruprecht et al.

[11] 4,053,537

[45] Oct. 11, 1977

[54] PROCESS FOR THE PRODUCTION OF ELASTIC COMPOSITES

[75] Inventors: Hans Dieter Ruprecht; Paul Henrichs, both of Cologne, Germany

[73] Assignee: Bayer Aktiengesellschaft, Leverkusen, Germany

[21] Appl. No.: 629,346

[22] Filed: Nov. 6, 1975

[30] Foreign Application Priority Data

Nov. 25, 1974 Germany .............................. 2455679

[51] Int. Cl.[2] .............................................. C08L 75/08
[52] U.S. Cl. .................................. 260/859 R; 260/2.3; 260/77.5 AP; 260/77.5 AT
[58] Field of Search ........ 260/2.3, 77.5 CR, 77.5 AT, 260/77.5 AP, 77.5 AA, 859 R, 37 N

[56] References Cited

U.S. PATENT DOCUMENTS

| | | | |
|---|---|---|---|
| 3,663,469 | 5/1972 | Weissmahr | 260/2.3 X |
| 3,711,444 | 1/1973 | Allen et al. | 260/77.5 NC |
| 3,726,944 | 4/1973 | Bennett et al. | 260/829 |
| 3,801,421 | 4/1974 | Allen et al. | 260/2.3 X |
| 3,956,541 | 5/1976 | Pringle | 260/23 X |

*Primary Examiner*—Murray Tillman
*Assistant Examiner*—Thomas De Benedictis, Sr.
*Attorney, Agent, or Firm*—Gene Harsh; Joseph C. Gil

[57] ABSTRACT

This invention relates to a process for the production of elastic composites, preferably used as floor coverings, from plastics granulates and polyisocyanates acting as binders. The process broadly comprises coating the plastic granulates with a paste of hydroxyl containing polyether, filler, and optionally pigment, subsequently mixing the coated granulates with the polyisocyanate binder, and thereafter molding and curing the resultant composite.

5 Claims, No Drawings

PROCESS FOR THE PRODUCTION OF ELASTIC COMPOSITES

BACKGROUND OF THE INVENTION

It is known that elastic composites can be produced from rubber or plastic particles using suitable binders or adhesives. Polyurethane plastics are preferably used as binders. It is often useful to add pigments and mineral fillers in order to obtain particular properties, for example, for coloring or for influencing hardness and elasticity. Substances of this kind may be added in different ways. Thus, as described in German Offenlegunsschrifts 1,720,059 and 2,156,255 which latter publication corresponds to a combination of U.S. Pat. applications Ser. Nos. 87682 and 88219 filed on Nov. 9, 1970, now U.S. Pat. Nos. 3,801,421 and 3,711,444 respectively, these substances are mixed into the binder, while as described in German Offenlegungsschrift 2 021 682 a powder-form pigment is mixed with the rubber granulate.

DESCRIPTION OF THE INVENTION

It has now surprisingly been found that the mechanical strength of the elastic composites described above can be significantly increased if, during their production, the rubber or plastic granulates are first coated with a paste of (a) hydroxyl-containing polyethers and (b) mineral fillers and/or pigments, and then mixed with the polyurethane binder. The resulting mixture is then molded and cured.

Accordingly, the present invention relates to a process for the production of elastic composites from rubber and/or elastomeric plastic granulates, a polyisocyanate binder and a paste of (a) hydroxyl-containing polyethers, and (b) mineral fillers and/or pigments, distinguished by the fact that the rubber and/or plastic granulates are first coated with the paste, subsequently mixed with the polyisocyanate binder and then hardened after molding.

The binders used in the process according to the invention for the production of the elastic composites are known per se. They are produced from polyisocyanates and polyhydroxyl compounds which react with each other in known manner.

The binders used in accordance with the invention may be produced from essentially any organic polyisocyanate, including aliphatic, cycloaliphatic, araliphatic, aromatic and heterocyclic polyisocyanates of the type described, for example, by W. Siefken in Justus Liebigs Annalen de Chemie, 562, pages 75 to 136. Specific examples include ethylene diisocyanate; 1,4-tetramethylene diisocyanates; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (U.S. Pat. 3,401,190); 2,4- and 2,6-hexahydrotolylene diisocyanate and mixtures of these isomers; hexahydro-1,3- and/or -1,4-phenylene diisocyanate; perhydro-2,4'-and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; triphenyl methane-4,4',4''-triisocyanate; polyphenyl polymethylene polyisocyanates of the type which may be obtained by condensing aniline with formaldehyde followed by phosgenation, such as are described in British Pat. Nos. 874,430 and 848,671; m- and p-isocyanatophenyl sulphonyl isocyanates as described in U.S. Pat. No. 3,454,606; perchlorinated aryl polyisocyanates of the type described in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described in British Pat. No. 994,890, Belgian Pat. No. 761,626 and published Dutch Pat. Application No. 7,102,524; polyisocyanates containing isocyanurate groups of the type described in U.S. Pat. No. 3,001,973, German Pat. Nos. 1,022,789; 1,222,067 and 1,027,394, and German Offenlegungsschrifts Nos. 1,929,034 and 2,004,048; polyisocyanates containing urethane groups of the type described in Belgain Pat. No. 752,261 or U.S. Pat. No. 3,394,164; polyisocyanates containing acylated urea groups as described in German Pat. No. 1,230,778; polyisocyanates containing biuret groups of the type described in U.S. Pat. Nos. 3,124,605 and 3,201,372, and British Pat. No. 889,050; polyisocyanates produced by telomerization reactions of the type described in U.S. Pat. No. 3,654,106; polyisocyanates containing ester groups of the type described in British Pat. Nos. 965,474 and 1,072,956, U.S. Pat. No. 3,567,763 and German Pat. No. 1,231,688; reaction products of the above-mentioned isocyanates with acetals as described in German Pat. No. 1,072,385; and polyisocyanates containing polymeric fatty acid radicals as described in U.S. Pat. No. 3,455,883.

It is also possible to use the isocyanate-group-containing distillation residues accumulating in the production of isocyanates optionally in solution in one or more of the aforementioned polyisocyanates. It is also possible to use mixtures of the aforementioned polyisocyanates.

In general, it is parrticularly preferred to use the readily available polyisocyanates, such as 2,4- and 2,6-tolylene diisocyanate and mixtures of these isomers ("TDI"); polyphenyl polymethylene polyisocyanates of the type obtained by condensing aniline with formaldehyde followed by phosgenation ("crude MDI"); and polyisocyanates containing carbodiimide groups, urethane groups, allophanate groups, isocyanurate groups, urea groups or biuret groups ("modified polyisocyanates"). According to the invention, it is particularly preferred to use pure or crude MDI.

Other starting components suitable for production of the binders are compounds having at least two isocyanate-reactive hydrogen atoms and molecular weights of generally from 400 to 10,000. Such compounds include compounds containing amino groups, thiol groups, hydroxyl groups and/or carboxyl groups. Compounds of this kind which are preferred are polyhydroxyl compounds, especially compounds containing from 2 to 8 hydroxyl groups, and especially those having a molecular weight in the range from 800 to 10,000, preferably from 1,000 to 6,000. Examples of such polyhydroxyl compounds include polyesters, polyethers, polythioethers, polyacetals, polycarbonates or polyester amides containing at least 2, generally 2 to 8, but preferably 2 to 4 hydroxyl groups, of the kind known per se for the production of homogeneous and cellular polyurethanes. According to the invention, it is preferred to use polyhydroxy polyethers. Suitable hydroxyl-group-containing polyesters include reaction products of polyhydric, preferably dihydric and, optionally, also trihydric alcohols with polyvalent, preferably divalent, carboxylic acids. Instead of using the free polycarboxylic acids, it is also possible to use the corresponding polycarboxylic acid anhydrides or corresponding polycarboxylic acid ester of lower alcohols or mixtures thereof for producing the polyesters. The polycarboxylic acids can be aliphatic, cycloaliphatic aromatic and/or heterocyclic and may optionally be substituted, for example by halogen atoms, and/or unsaturated. Examples of polycarboxylic acids of this kind are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally in admixture with monomeric fatty acids, terephthalic acid dimethyl ester and terephthalic acid-bis-glycol ester. Examples of suitable polyhydric alcohols include ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may also contain some terminal carboxyl groups. It is also possible to use polyesters of lactones, such as ε-caprolactone, or hydroxy carrboxylic acids, such as ω-hydroxy caproic acid.

The polyethers containing at least 2, generally 2 to 8, and preferably 2 to 3 hydroxyl groups suitable for use in producing the binders of the invention are also known per se and are obtained, for example, by the polymerization of epoxides such as ethylene oxide, propylene oxide, butylene oxide, tetrahydrofuran, styrene oxide or epichlorhydrin alone for example in the presence of $BF_3$, or by the chemical addition of these epoxides, optionally in admixture or in succession, to starter components containing reactive hydrogen atoms such as water, alcohols or amines. Suitable alcohols and amines include ethylene glycol, 1,3- or 1,2-propylene glycol, trimethylol propane, 4,4'-dihydroxy diphenyl propane, aniline, ammonia, ethanolamine or ethylene diamine. Sucrose polyethers of the type described for example in German Auslegeschrifts Nos. 1,176,358 and 1,064,938 may also be used in accordance with the invention. In many cases, it is preferred to use polyethers of the kind which contain predominant amounts of primary OH-groups (up to 90% by weight, based on all the OH-groups present in the polyether). Polyethers modified by vinyl polymers of the type formed, for example, by polymerizing styrene and acrylonitrile in the presence of polyethers (U.S. Pat. Nos. 3,383,351; 3,304,273; 3,523,093; and 3,110,695; and, German Pat. No. 1,152,536) are also suitable, as are polybutadienes containing OH-groups.

Particular examples of the polythioethers are the condensation products of thiodiglycol with itself and-/or with other glycols, dicarboxylic acids, formaldehyde, aminocarboxylic acids or aminoalcohols. The products are polythio mixed ethers, polythioether esters, polythioether ester amides, depending upon the co-components.

Example of suitable polyacetals are the compounds which can be obtained from glycols, such as diethylene glycol, triethylene glycol, 4,4'-dioxethoxy diphenyl dimethyl methane or hexane diol and formaldehyde. Polyacetals suitable for use in accordance with the invention can also be obtained by polymerizing cyclic acetals.

Suitable polycarbonates containing hydroxyl groups are those know per se which can be obtained by reacting diols such as 1,3-propane diol, 1,4-butane diol and-/or 1,6-hexane diol, diethylene glycol, triethylene glycol, or tetraethylene glycol with diaryl carbonates (such as diphenyl carbonate) or phosgene.

The polyester amides and polyamides include the predominantly linear condensates obtained from polyvalent saturated and unsaturated carboxylic acids or their anhydrides and polyhydric saturated and unsaturated amino alcohols, diamines, polyamines and mixtures thereof.

Polyhydroxyl compounds already containing urethane or urea groups, and optionally modified natural polyols such as castor oil, carbohydrates and starch, may also be used. Addition products of alkylene oxides with phenol-formaldehyde resins or even with urea-formaldehyde resins may also be used in accordance with the invention.

Examples of the many compounds suitable for use in producing the binder of the invention are known and are also described, for example, in High Polymers, Vol. XVI, "Polyurethanes, Chemistry and Technology, " by Saunders-Frisch, Interscience Publishers, New York, London, Vol. I, 1962, pages 32 to 42 and pages 44 to 54, and Vol. II, 1964, pages 5 to 6 and 198 to 199; and in Kunststoff-Handbuch, Vol. VII, Vieweg-Hochtlen, Carl-Hanser-Verlag, Munich, 1966, pages 45 to 71.

Compounds having at least two isocyanate-reactive hydrogen atoms and molecular weights in the range from 32 to 400, may also be used as starting components in producing the binder of the invention. Compounds of this kind include compounds which contain hydroxyl groups and/or amino groups and/or thiol groups and-/or carboxyl groups, preferably compounds which contain hydroxyl groups and/or amino groups and which serve as chain extenders or crosslinking agents. These compounds generally contain from 2 to 8 isocyanate-reactive hydrogen atoms, and preferably 2 to 3 reactive hydrogen atoms. The following are examples of compounds of this kind: ethylene glycol, 1,2- and 1,3-propylene glycol, 1,4-butylene glycol and 2,3-butylene glycol, 1,5-pentane diol, 1.6-hexane diol, 1,8-octane diol, neophentyl glycol, 1,4-bis-hydroxy methyl cyclohexane, 2-methyl-1,3-propane diol, glycerol, trimethylol propane, 1,2,6-hexane triol, trimethylol ethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy diphenyl propane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -amino-phthalic acid, succinic acid, adipic acid, hydrazine, N,N'-dimethyl hydrazine and 4,4'-diaminodiphenyl methane.

According to the invention, particularly preferred binders are mixtures of prepolymers containing free isocyanate groups and isocyanates free from urethane groups which have been obtained by reacting polyisocyanates with polyhydroxy polyethers in an NCO:OH ratio of 2:1 to 15:1. Such polyisocyanate binders should best have a viscosity in the range from 500 to 20,000 mPas, preferably in the range from 1,000 to 10,000 mPas, at 20° C. The binders are generally hardened by reaction with water, usually in the form of atmospheric moisture, in which case there is an additional reaction between the binder and the paste described in the following.

The pastes used in the process according to the invention contain, as mineral fillers, mineral fillers known per se, such as kaolin, calcium carbonate, silicon dioxide, asbestos and barium sulphate. Preferred pigments are inorganic pigments such as titanium dioxide, cadmium sulphide, iron oxide and chrominum oxide. the fillers and pigments should have grain sizes of from 0.1 to 100μm, and preferably from 1 to 50μm.

The pastes used in accordance with the invention contain, as the hydroxyl-containing polyethers, polyhydroxy polyethers of the type described above, and especially polyethers having 2 or 3 hydroxyl groups and molecular weights in the range from 500 to 6,000, preferably in the range from 1,000 to 4,000, or mixtures of these polyethers. Such polyethers may be obtained in known manner by adding ethylene oxide and/or propylene oxide to suitable starter molecules. The abovementioned alkylene oxides may also be used in admixture with one another or in succession in the preparation of the polyethers. Suitable starter molecules include water, ethylene glycol, 1,2-propylene glycol, trimethylol propane or glycerol. The polyethers may also have added to them up to 30% by weight, based on the weight of the polyethers, of low molecular weight compounds containing 2 to 3 hydroxyl groups, such as for example ethylene glycol, 1,2-propylene glycol, 1,4-butylene glycol, diethylene glycol, dipropylene glycol, trimethylol propane or glycerol.

The pastes prepared from the above-mentioned components generally contain (a) from 40 to 90% by weight of the hydroxyl containing polyether, optionally including low molecular weight diols and triols, and (b) from 60 to 10% by weight of mineral fillers and/or pigments. The mineral fillers are used in such quantities that the pastes are structurally viscous at 20° C, i.e. have a viscosity in the range from about 200 to 100,000 mPas, and preferably in the range from 5,000 to 50,000 mPas. On the one hand, this ensures that the pastes adhere adequately to the elastomer granulate. On the other hand, the pastes can still be conventiently handled in this viscosity range. The components are mixed in known manner by means of suitable machines, for example, a stirrer or roll stand, at temperatures in the range from 10° to 100° C.

The rubber or elastomeric plastic particles used in the process according to the invention may be of any shape and size. However, it is preferred to use elastic granulates of rubber or plastic waste in grain size of from 0.5 to 6 mm. Waste of this kind accumulates for example in the retreading of tires and in the manufacture of rubber or plastic articles.

To prepare the mixtures used in the process according to the invention, the rubber or elastomeric plastic particles are mixed with the paste in a quantitative ratio of 1 to 20 parts by weight, preferably 3 to 10 parts by weight, of paste to 100 parts be weight of rubber or plastic particles, in known manner, for example in a forced circulation mixer. Although the mixture thus prepared may be stored for prolonged periods in the absence of atmospheric moisture, it is preferred to subsequently mix in the binder in the same mixer, the quantitative ratio generally amounting to between 10 and 70 parts by weight and preferably to between 20 to 50 parts by weight of binder to 100 parts by weight of rubber or plastic particles.

After molding, the mixture is hardened by the action on the component containing isocyanate groups of water preferably atmospheric moisture, and the components containing hydroxyl groups present in the mixture. The hardening process may be accelerated by the addition of catalysts of the kind commonly used in polyurethane chemistry, such as tertiary amines or organometallic compounds.

Examples of catalysts suitable for use in accordance with the invention and details about the way in which they work may be found in Kunststoff-Handbuch, Vol. VII, published by Vieweg and Hochtlen, Carl-Hanser-Verlag, Munich, 1966, on pages 96 to 102.

The mixtures prepared by the process according to the invention may also contain further additives such as plasticizers, solvents, flameproofing agents, antiagers, emulsifiers and addhesion promoters.

Examples of additives such as these, other dyes and fillers, fungistatic and bacteriostatic substances and information on the use of these additives and the way in which they work can be found in Kunststoff-Handbuch, Vol. VII, published by Vieweg and Hochtlen, Carl-Hanser-Verlag, Munich, 1966, pages 103 to 113.

The elastic composites produced by the process according to the invention are preferably used as floor coverings, for example as coverings for playing fields, athletics tracks and indoor sports arenas, for children play areas and footpaths, and also as insulating layers for sound and heat insulation and vibration damping.

The advantage of the process according to the invention over conventional processes is that elastic composites produced in this way have a much high mechanical strength which provides for greater tensile strength and breaking elongation, higher resistance to wear and, hence, longer service life.

The following Examples demonstrate the advantages of the process according to the invention over conventional processes. Unless otherwise stated, figures represent parts by weight and % by weight.

EXAMPLE 1 (Comparison test)

368 parts by weight of a mixture of 60% by weight of 4,4'-diisocyanatodiphenyl methane and 40% by weight of 2,4'-diisocyanatodiphenyl methane are mixed with 632 parts by weight of polypropylene glycol (molecular weight 2000, 1.7% by weight of hydroxyl groups), followed by stirring for 3 hours at 60° C. A prepolymer is obtained having an NCO-content of 9.9% by weight and a viscosity of 2200 mPas at 25° C.

160 g of the binder described above are mixed in a polyethylene pot with 0.32 g of a 33% solution of 1,4-diazabicyclooctane in dipropylene glycol. Following the addition of 640 g of a granulate of tread rubber having a grain size of from 1 to 5 mm obtained from motor vehicle tires, the mixture is stirred until the rubber particles are completely wetted with binder. The mixture is distributed in a uniform thickness over a firm substrate covered with polyethylene film in a 30 × 30 × 2 cm frame coated with a release agent, and compacted with a smoothing plate to a thickness of 10 to 11 mm. Hardening is carried out at room temperature in the presence of atmospheric moisture. the panel can be mold-released after 15 hours. It reaches its final strength after storage for 1 week at room temperature. The panel has the following physical properties:

Tensile strength (according to DIN 53 504): 0.58 MPa
Breaking elongation (according to DIN 53 504): 36%

EXAMPLE 2 (Comparison test)

The procedure is as in Example 1, except that, before addition to the binder, the rubber granulate is carefully mixed with 10 g of iron oxide pigment.

The panel thus obtained has the following physical properties:

Tensile strength (according to DIN 53 504): 0.74 MPa
Breaking elongation (according to DIN 53 504): 57%

EXAMPLE 3 (Comparison test)

160 g of the binder described in Example 1 are mixed in a polyethylene pot with 0.32 g of a 33% solution of 1,4-diazabicyclooctane in dipropylene glycol and 32 g of a dye paste of 50 parts by weight of polypropylene glycol (molecular weight 2,000), 10 parts by weight of dipropylene glycol, 20 parts by weight of kaolin and 20 parts by weight of iron oxide pigment. The rubber granulate is then added, followed by further processing in the same way as in Example 1. The panel thus obtained has the following physical properties:

Tensile strength (according to DIN 53 504): 0.68 MPA
Breaking elongation (according to DIN 53 504): 30%

EXAMPLE 4 (according to the invention)

The procedure is the same as in Example 1, except that, before addition to the binder, the rubber granulate is carefully mixed with 32 g of the dye paste described in Example 3. The panel thus obtained has the following physical properties:

Tensile strength (according to DIN 53 504): 0.94 MPa
Breaking elongation (according to DIN 53 504): 80%

The mechanical properties of the composite produced in accordance with the invention are distinctly better than those of the comparison products.

What is claimed is:

1. A process for the production of an elastic composite comprising:
   a. coating rubber and/or elastomeric plastic granulates with a paste of
      i. a hydroxyl containing polyether and
      ii. mineral fillers and/or pigments,
   b. subsequently mixing a polyisocyanate binder therewith, and
   c. hardening the resultant mixture.

2. The process of claim 1, wherein the polyisocyanate binder is a mixture of prepolymers containing isocyanate groups and isocyanates free from urethane groups, said mixture obtained by reacting polyisocyanates with polyhydroxy polyether in a NCO to OH ratio of from 2:1 to 15:1.

3. The process of claim 2, wherein diphenylmethane diisocyanate is used as the isocyanate component.

4. The process of claim 1, wherein 1 to 20 parts be weight of said paste and 10 to 70 parts by weight of binder are used per 100 parts by weight of granulates.

5. The process of claim 5, wherein 3 to 10 parts by weight of said paste and 20 to 50 parts by weight of binder are used per 100 parts by weight of granulates.

* * * * *